(12) United States Patent
Mazieres

(10) Patent No.: US 7,128,359 B2
(45) Date of Patent: Oct. 31, 2006

(54) DEVICE FOR FIXING A RAIL TO A MOTOR VEHICLE FLOOR PAN AND THE METHOD USING SAID DEVICE

(75) Inventor: Laurent Mazieres, Paris (FR)

(73) Assignees: Renault S.A.S., Boulogne Billancourt (FR); Matra Automobile, Paris (FR)

( * ) Notice: Subject to any disclaimer, the term of this patent is extended or adjusted under 35 U.S.C. 154(b) by 0 days.

(21) Appl. No.: 10/488,300

(22) PCT Filed: Sep. 2, 2002

(86) PCT No.: PCT/FR02/02988

§ 371 (c)(1),
(2), (4) Date: Sep. 29, 2004

(87) PCT Pub. No.: WO03/020547

PCT Pub. Date: Mar. 13, 2003

(65) Prior Publication Data

US 2005/0092886 A1     May 5, 2005

(30) Foreign Application Priority Data

Sep. 3, 2001    (FR) .................................. 01 11373

(51) Int. Cl.
*B60N 2/00*    (2006.01)
(52) U.S. Cl. ..................................... 296/65.13; 248/429
(58) Field of Classification Search ............ 296/65.13, 296/65.14; 248/429, 430
See application file for complete search history.

(56) References Cited

U.S. PATENT DOCUMENTS

| | | | | |
|---|---|---|---|---|
| 3,685,872 A | * | 8/1972 | Babbs | 384/47 |
| 3,899,151 A | * | 8/1975 | Kobrehel | 248/429 |
| 4,691,946 A | * | 9/1987 | Sburlati et al. | 248/429 |
| 4,830,422 A | * | 5/1989 | Levitre | 296/65.03 |
| 5,499,788 A | * | 3/1996 | Rees | 248/430 |
| 5,527,080 A | * | 6/1996 | Wahlqvist | 296/63 |
| RE35,485 E | * | 4/1997 | Stewart | 248/429 |
| 5,967,604 A | * | 10/1999 | Yoshida et al. | 297/216.19 |
| 6,299,121 B1 | * | 10/2001 | Brault | 248/429 |

FOREIGN PATENT DOCUMENTS

| | | |
|---|---|---|
| DE | 19953499 | 5/2001 |
| FR | 2629400 | 10/1989 |
| FR | 2665125 | 1/1992 |
| FR | 2794408 | 12/2000 |
| GB | 2202736 | 10/1988 |
| WO | 0076801 | 12/2000 |

* cited by examiner

*Primary Examiner*—Dennis H. Pedder
(74) *Attorney, Agent, or Firm*—Oblon, Spivak, McClelland, Maier & Neustadt, P.C.

(57) ABSTRACT

A device used to fix a rail to a motor vehicle floor pan. The device includes a mechanism to position one of the ends of the rail in relation to the floor pan before the rail is fixed to the floor pan.

14 Claims, 2 Drawing Sheets

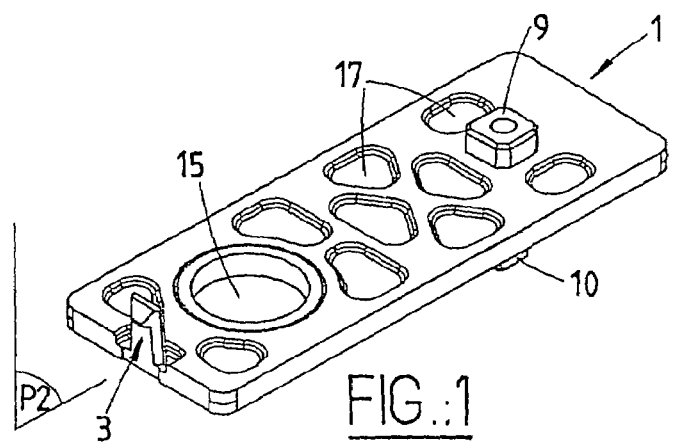
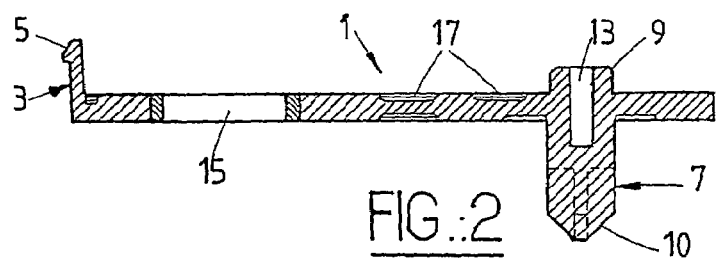
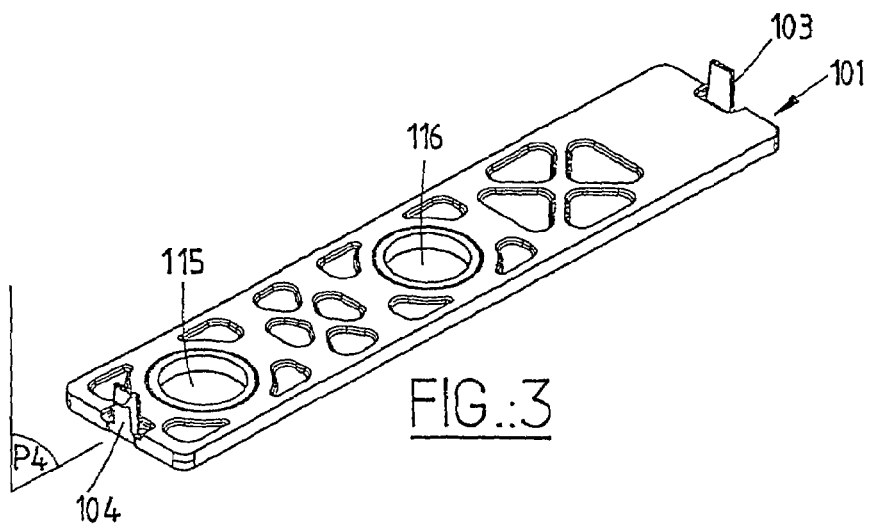
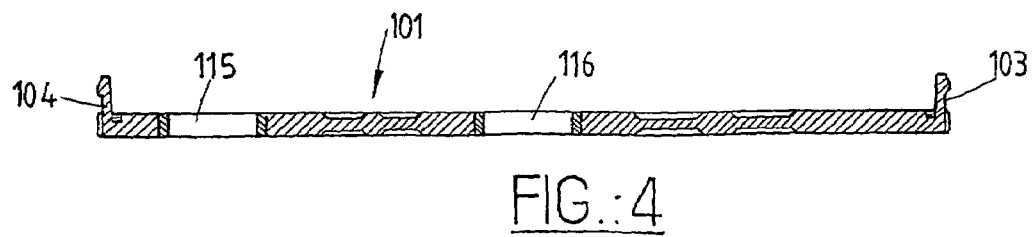

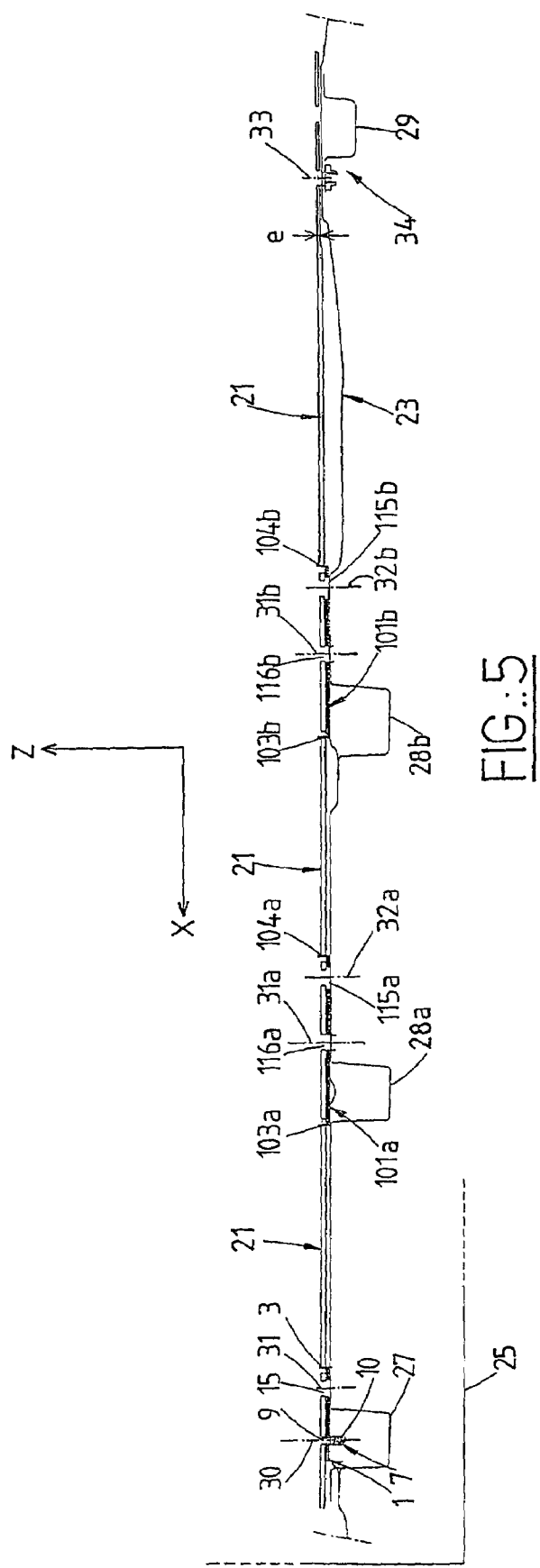

DEVICE FOR FIXING A RAIL TO A MOTOR VEHICLE FLOOR PAN AND THE METHOD USING SAID DEVICE

The present invention relates to a device for fixing a rail on a motor-vehicle floor and to a method using this device.

It is known that, in a motor vehicle, it must be possible to fix rails to the floor of this vehicle.

Such rails can be used in particular to support seats capable of sliding between a plurality of positions.

In some vehicles such as monocoque vehicles, common rails can be used for the front and rear seats.

In this case it is standard practice to use very long rails, which are particularly difficult to adjust to parallel condition during assembly.

However, any defect in parallelism can have disastrous consequences for sliding of the seats: in some cases, the seats can even become jammed.

It is therefore important that rigorously parallel mounting of the rails on the floor can be easily guaranteed: this in particular is the object of the present invention.

This invention achieves this object by providing, for fixing a rail on a motor-vehicle floor, a device noteworthy in that it is provided with means for positioning one of the ends of the said rail relative to the said floor prior to fixation thereof on this floor.

By virtue of these characteristics, after the said end has been positioned on the vehicle floor, the other end of the rail can be grasped in order to shift this rail around positioning means until it occupies the position that permits the required parallelism to be achieved and then this rail to be fixed on the floor once this position is reached.

According to other characteristics of this device:
- the said means are provided with a positioning peg intended to cooperate with holes formed in the said rail and in the said floor respectively,
- the said peg is formed in an end shim intended to be interposed between the said rail and the said floor,
- the said device is provided with at least one intermediate shim intended to be interposed between the said rail and the said floor,
- the said shim is provided with means for fixation on the said rail,
- the said fixation means are of the snap-in type,
- the said shim is provided with at least one orifice intended for passage of the means for fixing the said rail on the said floor.

The present invention also relates to an assembly of rail and floor noteworthy in that the said rail is fixed on the said floor by means of a device in conformity with the foregoing.

According to other characteristics of this assembly, when the said floor is provided with at least one crosspiece, the said shim is disposed substantially at right angles to the said crosspiece.

The present invention also relates to a method for mounting a rail on a motor-vehicle floor by means of a device according to the foregoing, noteworthy in that it comprises the stages in which the said positioning means are placed at one of the ends of the said rail, this end is positioned on the said floor using the said means, the orientation of the said rail is adjusted by shifting its other end, and the said rail is fixed on the said floor.

According to other characteristics of this method, the said shim is snapped onto the said rail before it is placed on the said floor.

Other characteristics and advantages of the present invention will become apparent on reading the description hereinafter and on examining the attached drawing, wherein:

FIG. 1 is a perspective view of a front shim forming part of an embodiment of the device according to the invention, FIG. 2 is a cross-sectional view of this front shim through plane P2 of FIG. 1, FIG. 3 is a perspective view of an intermediate shim that can be part of the device according to the invention, FIG. 4 is a cross-sectional view of this intermediate shim through plane P4 of FIG. 3, and FIG. 5 is a cross-sectional view of a rail fixed on the floor of a vehicle by means of a plurality of shims.

Referring now to FIGS. 1 and 2, there is illustrated a front shim 1 forming part of one embodiment of the device according to the invention.

As is evident in this figure, this front shim 1 defines a volume of generally parallelepiped shape.

This front shim 1 is provided at one of its ends with a fixation tongue 3 provided with an extension forming a catch 5.

In the vicinity of its other end, front shim 1 is provided with a positioning peg 7, whose cross section is, for example, generally square, and which is provided with a so-called upper part 9 extending above the shim and a so-called lower part 10 extending below the shim.

The terms "above" and "below" are to be understood relative to the position that front shim 1 is intended to occupy on the floor of a motor vehicle (see hereinafter).

Upper part 9 of peg 7 is provided with a bore 13.

It also will be noted that front shim 1 is provided with an orifice 15 as well as a certain number of recesses 17.

Front shim 1 is preferably obtained by molding a plastic material.

FIGS. 3 and 4 illustrate an intermediate shim 101 that can be part of the device according to the invention.

As is evident in these figures, intermediate shim 101 differs from front shim 1 mainly in that it is slightly longer than front shim 1, it is provided with a fixation tongue 103, 104 at each of its ends, it is provided with two orifices 115, 116 and it is not provided with an element analogous to peg 7 of front shim 1.

Referring now to FIG. 5, there is illustrated a rail 21 fixed on floor 23 of a motor vehicle 25, this floor being provided with a front crosspiece 27, two intermediate crosspieces 28a, 28b and a rear crosspiece 29.

Front and rear are to be understood relative to the direction of travel of vehicle 25, as symbolized by arrow X.

Arrow Z in turn is parallel to the vertical, and points "up" along this vertical.

Rail 21, which is formed from a single piece, preferably of metal, is adapted such that it can slidingly support components such as seats (not illustrated) intended to receive passengers.

A front shim 1 identical to that illustrated in FIGS. 1 and 2, represented as a bold line in FIG. 5, is interposed between rail 21 and floor 23, substantially at right angles to front crosspiece 27.

Upper part 9 of peg 7 extends inside a hole formed in rail 21 at right angles to front crosspiece 27, and lower part 10 of peg 7 cooperates with a hole formed in floor 23.

A screw 30 cooperating with bore 13 joins front shim 1 to rail 21, and a screw 31 passing through this shim via orifice 15 joins rail 21 to floor 23.

Shim 1 is additionally joined to rail 21 by snapping tongue 3 into a slit formed in this rail.

Two intermediate shims 101a, 101b are also interposed between rail 21 and floor 23, substantially at right angles to intermediate crosspieces 28a and 28b respectively.

Screws 31a, 32a on the one hand and 31b, 32b on the other pass respectively through shims 101a, 101b via orifices 115a, 116a on the one hand and 115b, 116b on the other formed in these shims, and join rail 21 to floor 23.

A screw 33 joins the rear end of rail 21 to floor 23.

Shims 101a, 101b are additionally joined to rail 21 by snapping tongues 103a, 104a and 103b, 104b into slits formed in this rail.

The advantages of the invention result directly from the foregoing.

To mount rail 21 on floor 23, front shim 1 and if necessary intermediate shims 101a, 101b are first snapped in under rail 21 by means of tongues 3, 103a, 104a, 103b, 104b.

While front shim 1 is being snapped in, upper part 9 of peg 7 becomes positioned in the hole provided for this purpose in rail 21.

Rail 21 equipped with its shims is then placed on floor 23 in such a way that lower part 10 of peg 7 becomes positioned in the hole formed for this purpose in floor 23.

The rear end of rail 21 is then grasped in order to shift this rail around the axis of peg 7 until it occupies the position that permits the required parallelism to be achieved.

Once this position has been reached, the rear end of this rail is fixed on floor 23 by means of screw 33.

Screws 30, 31, 31a, 32a, 31b, 32b are then put in place in such a way that they fix rail 21 very stably on floor 23.

As can now be understood, peg 7 provides a kind of support point, around which the orientation of rail 21 can be adjusted precisely.

In the prior art, a screw intended to engage with the floor was used instead of this peg: it was therefore necessary to allow for the play of this screw during fixation of the rail to the floor, thus introducing an additional adjustment parameter and in turn necessitating a relatively long adjustment time.

It will be noted that, in the example illustrated in FIG. 5, rear zone 34 of floor 23 is slightly higher than the zones in which front shim 1 and intermediate shims 101a, 101b are supported.

The presence of shims 1, 101a, 101b makes it possible to compensate for this difference in level and thus to ensure that rail 21 nevertheless extends in substantially straight manner.

If necessary, it is of course possible to machine rail 21 in such a way as to limit the effect of difference in level.

In the illustrated example, this machining has the form of smaller thickness e of rail 21 in its part situated in the vicinity of rear crosspiece 29.

It also will be noted that, because shims 1, 101a, 101b are positioned at right angles to crosspieces 27, 28a and 28b, it is possible to achieve good tearing resistance for rail 21 in the event of a collision.

Of course, the present invention is not limited to the described and illustrated embodiment, provided by way of an illustrative and non-limitative example.

The invention claimed is:

1. A device for fixing a rail on a floor of a motor-vehicle, comprising:
    an end shim having a portion configured to be interposed between the rail and the floor, said end shim including means for positioning one of ends of the rail relative to the floor prior to fixation thereof on the floor,
    wherein said means for positioning comprises a positioning peg configured to cooperate with holes formed in the rail and in the floor respectively, and
    wherein said portion and said positioning peg are a one-piece integral unit.

2. A device according to claim 1, further comprising at least one intermediate shim configured to be interposed between the rail and the floor.

3. A device according to claim 1, wherein the end shim is provided with means for fixation on the rail.

4. A device according to claim 3, wherein the means for fixation are of snap-in type.

5. A device according to claim 1, wherein the end shim is provided with at least one orifice configured for passage of the means for fixing the rail on the floor.

6. A device for fixing a rail on a floor of a motor-vehicle, said device comprising:
    an end shim having a portion configured to be interposed between the rail and the floor, said end shim having a positioning peg configured to cooperate with a hole in the rail and a hole in the floor, wherein said portion and said positioning peg are a one-piece integral unit.

7. A device according to claim 6, further comprising at least one intermediate shim configured to be interposed between the rail and the floor.

8. A device according to claim 6, wherein the end shim is provided with means for fixation on the rail.

9. A device according to claim 8, wherein the means for fixation is of a snap-in type.

10. A device according to claim 6, wherein the end shim is provided with at least one orifice configured to receive a means for fixing the rail on the floor.

11. An assembly comprising:
    a rail having a first hole;
    a floor having a second hole; and
    an end shim having a portion interposed between and fixing together said rail and said floor, said end shim having a positioning peg cooperating with said first hole and said second hole, and said portion and said positioning peg are a one-piece integral unit.

12. An assembly according to claim 11, wherein said floor is provided with at least one crosspiece, and wherein said end shim is disposed substantially at right angles to said at least one crosspiece.

13. A method for mounting a rail on a motor-vehicle floor using an end shim having a portion configured to be interposed between the rail and the floor, the end shim having a positioning peg configured to cooperate with a hole in the rail and a hole in the floor, and the portion and the positioning peg are a one-piece integral unit, said method comprising:
    placing the end shim at one end of the rail and positioning the one end of the rail on the floor using the end shim;
    adjusting the orientation of the rail by shifting the other end of the rail; and
    fixing the rail on the floor.

14. A method according to claim 13, wherein the end shim is snapped onto the rail before being placed on the floor.

* * * * *